United States Patent
Veprik

(10) Patent No.: US 10,495,354 B2
(45) Date of Patent: Dec. 3, 2019

(54) LOW VIBRATION CRYOGENIC REFRIGERATOR

(71) Applicant: Semi Conductor Devices—an Elbit Systems-Rafael Partnership, Haifa (IL)

(72) Inventor: Alexander Veprik, K.Motzkin (IL)

(73) Assignee: SEMI-CONDUCTOR DEVICES—AN ELBIT SYSTEMS-RAFAEL PARTNERSHIP, Haifa (IL)

( * ) Notice: Subject to any disclaimer, the term of this patent is extended or adjusted under 35 U.S.C. 154(b) by 145 days.

(21) Appl. No.: 15/530,618

(22) Filed: Feb. 8, 2017

(65) Prior Publication Data

US 2017/0254570 A1    Sep. 7, 2017

(30) Foreign Application Priority Data

Mar. 3, 2016  (IL) .......................................... 244428

(51) Int. Cl.
| | |
|---|---|
| F25B 9/14 | (2006.01) |
| F16F 7/10 | (2006.01) |
| F16F 7/116 | (2006.01) |
| F16F 1/32 | (2006.01) |

(52) U.S. Cl.
CPC .............. *F25B 9/14* (2013.01); *F16F 7/1011* (2013.01); *F16F 7/116* (2013.01); *F16F 1/326* (2013.01); *F25B 2309/1428* (2013.01); *F25B 2500/13* (2013.01)

(58) Field of Classification Search
CPC .......... F25B 9/14; F25B 2500/13; F16F 7/116
See application file for complete search history.

(56) References Cited

U.S. PATENT DOCUMENTS

| | | | | |
|---|---|---|---|---|
| 4,798,054 A | * | 1/1989 | Higham | .................... F25B 9/14 60/520 |
| 5,412,951 A | | 5/1995 | Wu | |
| 5,522,214 A | * | 6/1996 | Beckett | ................. F02G 1/0435 267/161 |
| 5,895,033 A | * | 4/1999 | Ross | ........................ F16F 7/116 267/161 |
| 6,886,348 B2 | * | 5/2005 | Ogura | ..................... F02G 1/043 62/6 |

(Continued)

FOREIGN PATENT DOCUMENTS

WO    WO 2014/206542    12/2014

OTHER PUBLICATIONS

European Search Report dated Sep. 8, 2017.
(Continued)

*Primary Examiner* — Brian M King
(74) *Attorney, Agent, or Firm* — Haug Partners LLP; William S. Frommer

(57) ABSTRACT

A mechanical system, such as cryogenic refrigerator system, is described. The system comprises two or more axial moving elements generating two or more cyclic forces along parallel axes and a vibration attenuation unit. The cyclic forces are provided with common frequency and certain phase difference between them. The vibration attenuation unit is configured for attenuating vibrations corresponding to two or more modes of vibrations characterized by a frequency corresponding to operation frequency of said two or more cyclic forces.

10 Claims, 9 Drawing Sheets

(56) References Cited

U.S. PATENT DOCUMENTS

2004/0025502 A1* 2/2004 Okano ................ F02G 1/0435
  60/517
2009/0007560 A1 1/2009 Inoshiri

OTHER PUBLICATIONS

Veprik, A.M. et al, "Ultra-low vibration split Stirling linear cryogenic cooler with a dynamicaly counterbalanced pneumatically driven expander", *Cryogenics*, No. 45, (2005), pp. 117-122.

* cited by examiner

LOW VIBRATION CRYOGENIC REFRIGERATOR

TECHNOLOGICAL FIELD

The present invention is in the field of vibration attenuation of mechanical system and is specifically related to attenuation of vibration in Split Stirling cryogenic refrigerator and the like.

BACKGROUND

Refrigeration systems are widely used for providing and maintaining controlled and cryogenic temperatures for various applications. Among other examples, well known are cooled Infrared (IR) imagers, converting infrared radiation into visual imagery. Generally, the operating principle of IR imagers is based on the fact that warmer objects radiate in IR wavelength range more, and colder object radiate less. Noise levels in IR detection are usually strongly dependent on the operating temperature of the IR detector and therefore, high-edge imagers generally rely on mechanical Stirling cryogenic cooling.

Stirling cryocoolers, which may be of both split and integral types, typically comprise two major components: a compressor and an expander. In a split cooler these are interconnected by a flexible gas transfer line (a thin-walled stainless steel tube of a small diameter) to provide for maximum flexibility in the system design and to isolate the IR detector from the vibration interference which is produced by the compressor. In the integral cooler these components are integrated in a common casing.

The reciprocating motion of a compressor piston provides the required pressure pulses and the volumetric reciprocal change of a working agent (helium, typically) in the expansion space of an expander. A displacer, reciprocating inside a cold finger, shuttles the working agent back and forth from the cold side to the warm side of the cooler. During the expansion stage of the thermodynamic cycle, heat is absorbed from the IR detector mounted upon the cold finger tip (cold side of a cycle), and during the compression stage, heat is rejected to the ambient from the cold finger base (warm side of a cycle).

Modern split Stirling linear cryocoolers are usually comparable with their rotary rivals in terms of weight, size and power consumption. However they offer higher reliability, lower noise and vibration signature over the typical high frequency range, aural non-detectability, lower parasitic losses, flexibility in the system design, etc.

As different from fully counterbalanced integral rotary rivals, the vibration export produced by the separated compressor and expander units of a typical split Stirling cryocooler is normally higher at the driving frequency. This especially holds true for cryocoolers featuring single piston imbalanced compressors. Using dual-piston compressors results in particular attenuation of vibration export, however, because of the sub-compressor dissimilarity, not to the extent typical of integral rotary cryocoolers. In spite of the small moving mass and stroke of the fundamentally single piston unbalanced expander, its vibration export cannot be ignored.

Typically, the compressor and expander units are placed side by side with minimum offset, thus forming the most compact space saving U shape. In general, vibration export produced by such a split linear cooler may be characterized as a combination of two dynamic forces or as a resultant dynamic force and moment, the frequency of which equals the driving frequency. Depending on the payload inertia and mounting conditions, relative distance between the compressor and expander units along with the distance from the payload center of gravity, this vibration export may result in translation and angular vibration manifesting itself in dynamic defocusing occurring when translational displacement becomes comparable with the focus depth and line of sight jitter occurring when the amplitude of in-plane focal plane array (FPA) motion becomes comparable with pixel size.

Tuned dynamic absorbers (TDA) are widely used for attenuating the vibration export produced by the split Stirling cryogenic coolers, typically working at constant driving frequency.

U.S. Pat. No. 5,895,033 describes a passive balance system for counterbalancing vibrations of a machine. The passive balance system includes a support member adapted to be fixedly carried by the machine and a flexure assembly carried by the support member. The flexure assembly is in the form of at least one flat spring including connections along a central portion. The central portion is fixedly mounted to the support member, and an outer peripheral portion of the flat spring provides at least in part a movable counterbalance mass. The flexure assembly presents the counterbalance mass for movement in substantial alignment with a desired rectilinear component of vibration of the machine to counterbalance vibrations emanating therefrom. A vibration balanced machine having the passive balance system is also disclosed.

WO 2014/206542 describes a compensating oscillation device for a linear piston system. The compensating oscillation device comprises a housing, at least two coupling elements, and a centrifugal mass, which can be deflected along an axis by means of each coupling element and which is coupled to the housing. Each coupling element is fastened to the housing at least one fastening region and to the centrifugal mass at least one connecting region. According to the invention, on each of the at least two coupling elements, the at least one connecting region to the centrifugal mass is radially closer to the axis than the at least one fastening region to the housing, and the centrifugal mass is arranged between two coupling elements in the axial direction in the idle state. The invention further relates to a linear piston system, comprising a piston, which is supported in such a way that the piston can be moved linearly, and comprising such a compensating oscillation device.

US 2009/007560 describes a vibration suppression apparatus includes a leaf spring having one end connected to one end in the vibrating direction of a Stirling refrigerator which is a reciprocating motion apparatus, a balance mass connected to the other end of the leaf spring, and a damper including a damping body connected to the balance mass and vibrating in phase with the balance mass. With this structure, the high-performance vibration suppression apparatus including the elastic body and the damper can be manufactured with a small size and at a low cost.

The disadvantage of such a single degree of freedom (SDOF) TDAs is that their design allows motion of the counterbalance mass in essentially axial direction, thus, in case of side-by-side package, the only compressor induced force export may be attenuated. For vibration sensitive applications relying on side-by-side packaged cryocooler, the secondary, smaller and matched TDA may be mounted inline with the expander. This results in added mechanical complexity and extra cost.

General Description

There is, thus, a need in the art for a novel vibration attenuation technique suitable for use in association with mechanical system, e.g. comprising two or more active components, generating corresponding two or more parallel cyclically varying mechanical forces. The present invention provides a system and technique for attenuating vibrations generated as a result of spaced apart parallel forces having essentially common frequency with certain phase lag between the forces. In this connection the technique of the invention is generally described herein with respect to split Stirling type cryogenic refrigerator, however it should be understood broadly and suitable for attenuating vibrations generated by various other mechanical forces.

To this end the vibration attenuation unit of the invention is generally connectable with mechanical system, such as split Stirling cryogenic refrigerator, via a rigid connection and configured to reduce vibration of the mechanical system. The vibration attenuation unit is typically configured to attenuate vibration at driving frequency of the mechanical system. Further, the vibration are typically associated with two (translation and tilt) or more, generally three (translation and two tilts) modes of vibrations. In some configurations, additional vibration modes may also be attenuated based on configuration of the vibration attenuation unit.

The technique of the invention is based on the inventor's understanding that by matching the resonant frequency of a "mass-spring" tuned dynamic absorber (TDA) with typical driving frequency, the reaction force produced by the TDA is equal in magnitude and opposite in direction to the vibration export. Therefore, the use of appropriately tuned TDA eliminates, or at least significantly reduces the residual vibration. Further, a single mass TDA may be configured as having substantially similar resonant translational and tilt frequencies, thereby extending the aggregate effect.

As indicated above, the present invention is described herein in accordance with the exemplary configuration of a split Stirling cryogenic refrigerator. A split Stirling refrigerator is generally configured with a side-by-side mounted compressor and expander units. In general, vibration export produced by such a split linear cooler may be thought of as a pair of parallel and coherent dynamic forces acting along the compressor and expander axis or as a resultant dynamic force and moment, the frequency of which equals the driving frequency. Depending on the payload inertia and mounting conditions, relative distance between the compressor and expander units along with the distance from the payload center of gravity, this vibration export may result in translation and angular vibration manifesting itself in the form of dynamic defocusing occurring when translational displacement becomes comparable with the focus depth and line of sight jitter occurring when the amplitude of in-plane focal plane array (FPA) motion becomes comparable with size of pixel.

The reciprocating motion of a compressor piston provides the cyclic pressure and the volumetric flow of a working agent (helium, typically) in the expansion space of an expander. A displacer, reciprocating inside a cold finger, shuttles the working agent back and forth from the cold side to the warm side of the cooler. During the expansion stage of the thermodynamic cycle, heat is absorbed from the IR detector mounted upon the cold finger tip (cold side of a cycle), and during the compression stage, heat is rejected to the ambient from the cold finger base (warm side of a cycle).

Thus, the present invention, in some configurations thereof, provides a closed cycle split Stirling cryocooler, utilizing side-by-side configuration of the compressor and expander units (e.g. with particular minimum offset), whereupon the cooler induced translational and angular vibrations are attenuated down to the acceptable levels using a vibration attenuation unit, e.g. including tunable multimodal tuned dynamic absorber (TDA). The vibration attenuation unit is configured to eliminate, or at least significantly attenuate, cooler induced vibration. In the exemplary configuration of a side-by-side split Stirling cryogenic refrigerator, these typical vibration modes generally include one translational mode along axis of translation of the compressor piston and two tilting modes. Additionally, the frequencies of the different vibration modes are essentially similar and equal the driving frequency.

The vibration attenuation unit according to some embodiments of the present invention utilizes a multimodal TDA comprising at least one planar flexural bearing and a proof mass assembly. The flexural bearing is configured as a spring-like planar element, rigidly connected to the mechanical system (e.g. Stirling cryocooler) at one end thereof and to the proof mass assembly at another end. In some configuration, the flexural bearing may be configured in the form of a circular planar spring with symmetrical spiral slots. Further, the proof mass assembly may be formed by coaxial arrangement comprising at least primary and secondary circular proof mass elements (typically in the form of rings). The circular spring element may be connected to the mechanical system at a central anchor thereof and the proof mass assembly may be mounted in a circular symmetric fashion at periphery of the circular spring.

Further, in some embodiments, the central and periphery portions of the flexural bearing are configured with frictionless (substantially rigid) features configured to provide fixed and rigid fastening to the mechanical system (e.g. through the compressor housing of a split Stirling refrigerator) and to the proof mass assembly, respectively. Generally, according to some embodiments, the secondary proof ring of the proof mass assembly may be configured to be displaceable along an axial direction with respect to the primary proof ring. Thus, in these embodiments, the primary proof ring is attached to the flexural bearing in a fixed location and the secondary proof ring may be fastened at a selected location. For example, the secondary proof rind may be configured to slide axially with respect to the primary proof ring and fastened in selected appropriate position using one or more radial screws (e.g. setscrews).

In such embodiments, the resonant translational frequency of the vibration attenuation system is dependent on the total mass of the proof mass assembly and axial spring rate of the flexural bearing. Additionally, resonant frequencies of the vibration attenuation unit along tilt modes depend on the angular spring rate of the said flexural bearing and moment of inertia of the proof mass assembly. The moment of inertia of the proof mass assembly can be tuned by selection of axial displacement of the secondary proof ring along the axial direction. Thus, by mechanical design of the flexural bearing and proof rings, the frequencies of the translation and tilting modes may be configured to be essentially equal the working frequency typical of the associated mechanical system.

More specifically, the total mass of the proof mass assembly may be determined in accordance with the spring rate of the flexural bearing to provide the desired axial frequency. Further, location of the secondary proof ring is selected to tune moment of inertia of the vibration attenuation unit in accordance with the spring rate of the flexural bearing and provide substantially similar frequency without affecting the aggregate mass and, therefore, translational frequency. In this connection it should be noted that the term substantially similar frequency relates to a frequency that is equal or almost equal to frequency of operation of the mechanical system. This enables tuning of operational frequency of the vibration attenuation unit in accordance with typical frequency of the associated mechanical system, e.g. driving frequency of a split Stirling cryogenic refrigerator.

Thus, according to a broad aspect of the invention, there is provided a cryogenic refrigerator system comprising: linear Split Stirling unit having an expander unit and a compressor unit mounted in a side by side configuration upon a common frame, and a vibration attenuation unit attached to the Split Stirling unit. Wherein said vibration attenuation unit is configured for attenuation of two or more modes of vibration characterized by a frequency corresponding to operation frequency of said linear Split Stirling unit. Generally, according to some embodiments, the operation frequency of the Split Stirling unit may be a fixed frequency.

According to some embodiments, the vibration attenuation unit may be configured for vibration attenuation along at least one axial mode and at least two tilt modes with respect to a predetermined reference axis of the system.

According to some embodiments, the vibration attenuation unit may comprise an undamped mass-spring system comprising a planar flexural bearing and a proof mass assembly. The planar flexural bearing may be configured as a planar circular disc comprising a plurality of symmetrical spiral slots, said planar flexural bearing is connectable to the proof mass assembly at a peripheral anchor and to said Split Stirling unit at a central anchor thereof. The flexural bearing may typically be made of metal or metal alloy. Generally the material of the flexural bearing may have spring features/properties.

According to some embodiments, total mass and arrangement of the proof mass elements of the proof mass assembly are configured with respect to corresponding spring constants of said flexural bearing to provide desired resonant frequencies associated with said of two or more modes of vibration. The desired resonant frequencies are preferably selected to be substantially similar to an operational frequency of said linear Split Stirling unit. To this end the term substantially related to a reasonable margin of error corresponding with acceptable variation in driving frequency of the split Stirling unit, which may be within a range of up to 0.1 Hz.

According to some embodiments, the vibration attenuation unit is configured with a predetermined mass of the proof mass assembly and predetermined axial and angular spring constants. The total mass of the proof mass assembly may generally be determined to provide a desired axial frequency for minimizing axial vibrations. When the vibration attenuation unit is attached to a mechanical system, e.g. the split Stirling cryogenic refrigerator, the driving frequency of the refrigerator can be tuned to determine working frequency providing minimal axial vibration amplitude.

According to some embodiments, the proof mass assembly may comprise at least one primary proof mass element mounted fixedly on a peripheral anchor of said flexural bearing, and at least one secondary proof mass element mounted on and moveable with respect to said primary proof mass element. The primary and secondary proof mass elements may preferably be configured as concentric rings.

Generally, according to some embodiments, the vibration attenuation unit is configured to be circularly symmetric.

In some configurations of the cryogenic refrigerator, the vibration attenuation unit may be mounted in-line with axis of translation of a piston of said compressor unit.

Additionally, according to some embodiments of the inventions, the vibration attenuation unit may be located within an evacuated chamber having sub-atmospheric pressure for reducing the aerodynamic damping, aural noise generation and transmission. The pressure within the evacuated chamber may be in the range of $10^{-2}$ to $10^{-4}$ Torr.

According to yet another broad aspect of the invention there is provided a system comprising a mechanical system comprising two or more axial moving elements generating two or more cyclic forces along parallel axes, said two or more cyclic forces having common frequency and certain phase difference between them, and a vibration attenuation unit. The vibration attenuation unit comprises flexural bearing connectable to said mechanical system and to a proof mass assembly, wherein total mass and arrangement of masses of said proof mass assembly are configured to provide resonant frequencies corresponding to two or more modes of vibrations to be similar to said common frequency of the cyclic forces of said mechanical system, thereby providing vibration attenuation along said two or more modes of vibrations.

The mechanical system may generate cyclic axial vibrations along an axis parallel to axes of said cyclic forces and cyclic tilt vibrations about certain point of reference, the vibration attenuation unit may thus be configured with resonant frequencies for vibrations mode corresponding with said cyclic axial vibrations and said cyclic tilt vibrations to thereby attenuate said axial and tilt vibrations.

According to some embodiments of the invention, the flexural bearing of said vibration attenuation unit may be configured as a flat spring element and is attached to said mechanical system at a central region thereof. Additionally, the proof mass assembly may be mounted at periphery of said flat spring and may comprise first fixed proof mass element and second proof mass element moveable along a predetermined axis; wherein variation in location of said second proof mass enables tuning of resonant frequency of the vibration attenuation unit with respect to at least one vibration mode while not affecting resonant frequency with respect to at least one other vibration mode, thereby enabling tuning of anti-resonant frequencies with respect to said two or more modes of vibrations to be substantially similar.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
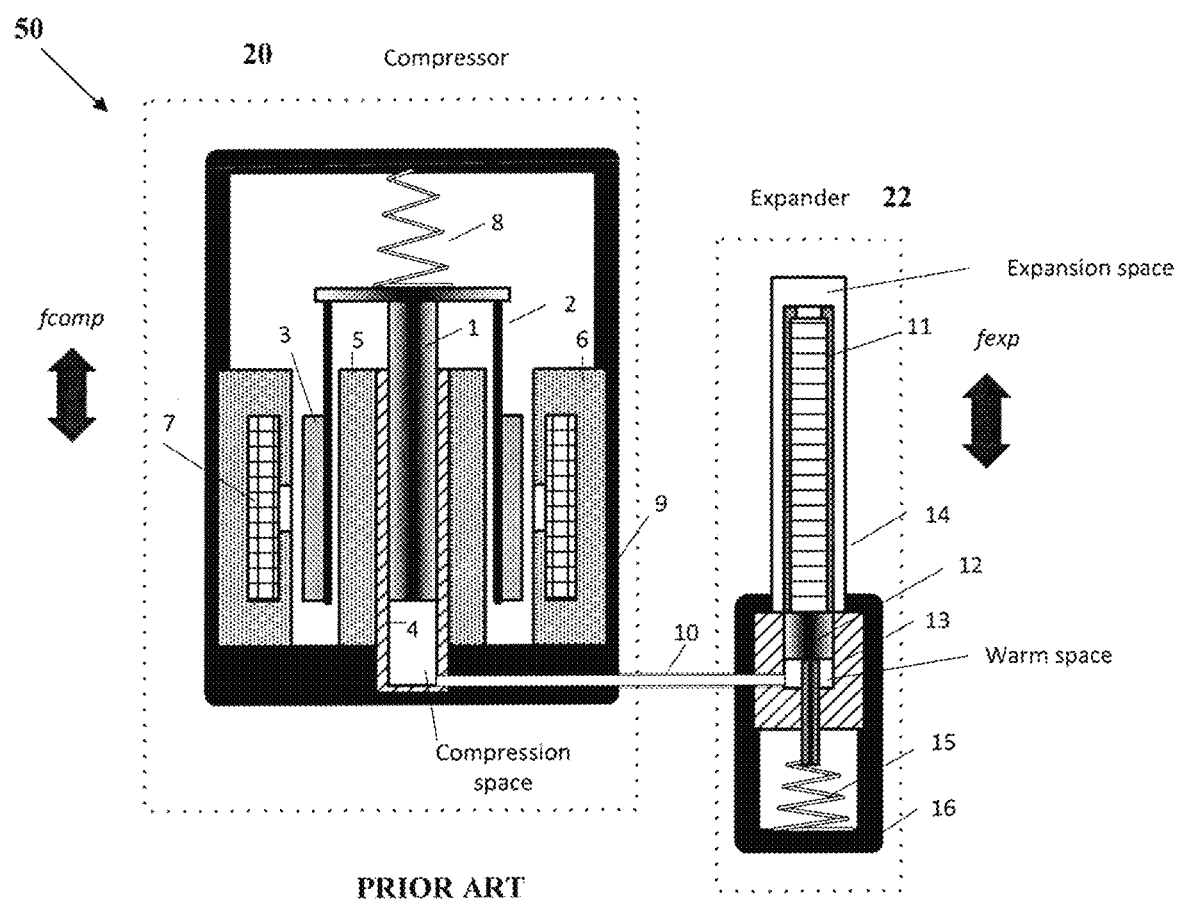
FIG. 1 schematically illustrates a split Stirling type cryogenic refrigerator as known in the art.

Reference is now made to FIG. 1 showing diagrammatically the typical design of a split Stirling linear cryogenic cooler 50 as known in the art. The split Stirling linear cryogenic cooler includes a compressor unit 20 and an expander unit 22 connected between them by transfer line 10 allowing cyclic transmission of working agent from the compressor 20 to the expander 22 and vice versa.

The compressor unit 20 typically includes a cylindrical piston 1 located to be axially movable by a tubular magnet holder 2 and radially magnetized permanent magnet ring 3. The piston 1 is configured to slide along a predetermined axis inside a tubular piston sleeve 4 that is tightly matched to the piston diameter thus providing for a clearance seal. The magnet ring 3 is located inside an air gap formed by coaxial and tubular inner 5 and outer 6 yokes, whereupon a tubular driving coil 7 is enveloped by the outer yoke. The piston is generally further connected to a return spring 8 configured to maintain average central position of the moving assembly. The compressor is typically further encapsulated inside a leak proof compressor housing 9.

The driving coil 7 receives electrical power (e.g. alternating current) and provides alternating magnetic flux in the tubular air gap between inner and outer yokes. Interaction of the alternating and permanent magnetic fluxes generated by the driving coil 7 and the magnet ring 3 results in cyclic axial force and, therefore, cyclic piston reciprocation. Motion of the piston 1 within the sleeve 4 provides compression and expansion of the working agent in the compression space. The compression space is pneumatically communicating with the warm space of the expander unit through the transfer line 10.

The moving assembly of the expander unit 22 includes displacer/regenerator assembly 11, which may typically be configured as a plastic cartridge filled with porous regenerative heat exchanger (e.g. typically including metal screen or balls). The displacer/regenerator assembly 11 is connected to a stepped driving plunger 12, which is configured to be slidable inside tightly matched stepped bushing 13, thus, forming front clearance seals. The displacer/regenerator 11 is also configured to be slidable axially within a tightly matched thin-walled cold finger 14, thus, forming rear clearance seal. The moving assembly of the expander 22 is supported by a return spring 15 within a sealed stationary housing 16. The return spring 15 and the moving assembly of the expander 22 generally form a resonant dynamic system. The resonant frequency of the return spring 15 and moving assembly of the expander 22 normally equals the driving frequency of the cooler.

Cyclic pressure oscillations produced in the compression 20 space are transferred into the warm space of expander unit 22 and results in pneumatic resonant actuation and reciprocation of the regenerator/expander assembly 11. The working agent may flow from the warm space to the cold space and vice versa though the small conduits arranged in the driving plunger (not shown) and through the porous regenerative heat exchanger. Generally, when operating at resonance frequency, the pressure and the volumetric flow through the regenerator 11 of the working agent are lagged by a phase of approximately 90 degrees, such that the expanding working agent in the expansion space produces work on the moving assembly. This results in cooling effect and recovery of expansion work typical of Stirling-type cryocooler.

As mentioned above, both the compressor 20 and expander 22 units include reciprocating elements; thus producing vibration exports at the operation frequency. As generally known in the art, the mechanical forces generated by the compressor 20 and expander 22 units may be presented as:

$$f_1 = 0.5 M_{piston} \Delta_{piston} \omega^2 \sin(\omega t) \quad \text{(equation 1)}$$

$$f_2 = 0.5 M_{displacer} \Delta_{displacer} \omega^2 \sin(\omega t + \varphi) \quad \text{(equation 2)}$$

where $\omega$ is the angular driving frequency, $M_{piston}$ and $M_{displacer}$ are the masses of the moving elements and $\Delta_{piston}$, $\Delta_{displacer}$ are strokes in the compressor 20 and expander 22, respectively. Further, $\varphi$ is a phase delay.

Figure 2:
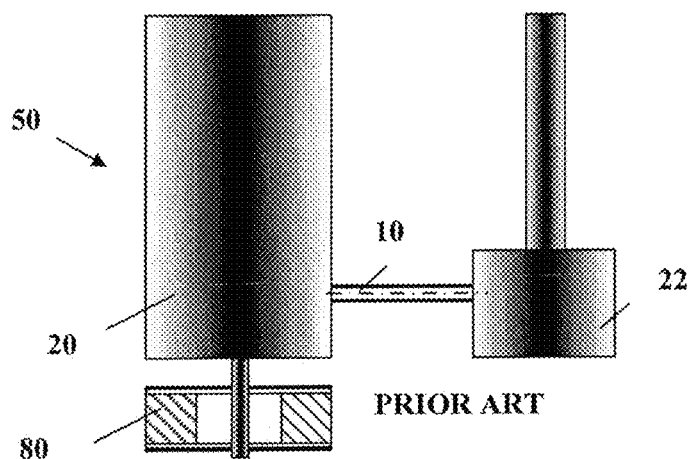
FIG. 2 schematically illustrates a prior art configuration of split Stirling cryogenic refrigerator with tuned dynamic absorber.

Reference is made to FIG. 2 schematically illustrating a side-by-side split Stirling cryogenic cooler 50 as described above including a tuned dynamic absorber 80 configured to attenuate vibrations generated by the cryogenic cooler 50. Generally, the compressor 20 and expander 22 units are placed side-by-side with the minimum offset while being connected using transfer line 10.

Various configurations suitable for the vibration attenuation unit 80 are known in the art. A typical conventional tuned dynamic absorber (TDA) 80 used in the existing system generally includes an un-damped "spring-mass" system. The TDA is generally configured with translational resonant frequency being exactly equal to the driving frequency of the cryogenic cooler. The lumped mass frequencies, associated with additional modes such as tilting, in-plane and rotation about TDA axis, are well separated from translation frequency. This separation results in single directional axial motion of the proof mass of the TDA and producing a counterbalancing effect to the axial vibrations generated by the cryogenic cooler.

Figures 3A, 3B:
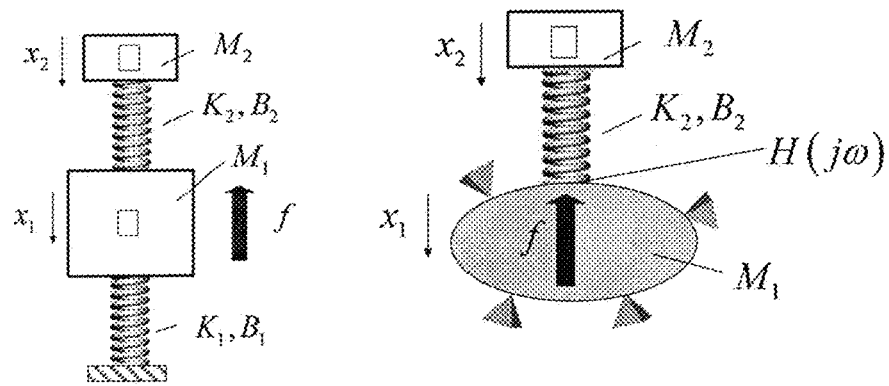
FIGS. 3A and 3B exemplify two vibration attenuation models suitable for reducing vibrations of mechanical systems.

Reference is made to FIGS. 3A and 3B illustrating two variations of a dynamic model of vibration attenuation unit, or TDA. FIG. 3A illustrates a dynamic model of a mass $M_1$ hung on a spring and carrying a vibration attenuation unit having mass $M_2$. FIG. 3B illustrates the dynamic system (generally of arbitrary structure) mounted on an anchor. The dynamic properties of the anchor are represented by a complex frequency response function of the local compliance $H(j\omega)$.

As shown in FIG. 3A, mass $M_1$ is mounted on a stationary base being supported by a viscoelastic member characterizing by linear stiffness and damping $K_1$, $B_1$, respectively. A TDA attached to the mass M is schematically represented as a secondary single degree of freedom system having mass $M_2$ supported from the primary mass by a viscoelastic member characterizing by the stiffness and damping $K_2$, $B_2$, respectively. The vibration export is represented as a tonal force f(t) of a fixed angular frequency co. This generally results in translational responses of the primary $M_1$ and secondary $M_2$ masses, $x_1(t)$ and $x_2(t)$, respectively. These motions are represented by:

$$M_1\ddot{x}_1 + K_1 x_1 + K_2(x_1-x_2) + B_1\dot{x}_1 + B_2(\dot{x}_1-\dot{x}_2) = f$$

$$M_2\ddot{x}_2 - K_2(x_1-x_2) - B_2(\dot{x}_1-\dot{x}_2) = 0 \quad \text{(equation 3)}$$

A solution for the steady state motion can be determined using complex Fourier transform $G(j\omega)=\int g(t)e^{-j\omega t}dt$, where $\omega$ is angular frequency and $j=\sqrt{-1}$ is complex unity. Thus equation 3 becomes a system of linear equations in the frequency domain:

$$[-\omega^2 M_1 + (K_1+j\omega B_1) + (K_2+j\omega B_2)]X_1 - (K_2+j\omega B_2)X_2 = F$$

$$[-\omega^2 M_2 + (K_2+j\omega B_2)]X_2 - (K_2+j\omega B_2)X_1 = 0 \quad \text{(equation 4)}$$

The dynamic responses $X_1(j\omega)$, $X_2(j\omega)$ and the force transmitted to the base $N(j\omega)=(K_1+j\omega B_1)\cdot X_1(j\omega)$ can be extracted:

$$X_1(j\omega) = \frac{-\omega^2 M_2 + (K_2+j\omega B_2)}{[-\omega^2 M_1 + (K_1+j\omega B_1) + (K_2+j\omega B_2)]} F(j\omega) \quad \text{(equation 5)}$$
$$[-\omega^2 M_2 + (K_2+j\omega B_2)] - (K_2+j\omega B_2)^2$$

$$X_2(j\omega) = \frac{(K_2+j\omega B_2)}{[-\omega^2 M_1 + (K_1+j\omega B_1) + (K_2+j\omega B_2)]} F(j\omega)$$
$$[-\omega^2 M_2 + (K_2+j\omega B_2)] - (K_2+j\omega B_2)^2$$

$$N(j\omega) = \frac{[-\omega^2 M_2 + (K_2+j\omega B_2)](K_1+j\omega B_1)}{[-\omega^2 M_1 + (K_1+j\omega B_1) + (K_2+j\omega B_2)]} F(j\omega)$$
$$[-\omega^2 M_2 + (K_2+j\omega B_2)] - (K_2+j\omega B_2)^2$$

This solution can be further simplified under the assumption that there is no damping in the TDA, denoting $B_2=0$ yields:

$$X_1(j\omega) = \frac{K_2 - \omega^2 M_2}{[-\omega^2 M_1 + (K_1+j\omega B_1) + K_2]} F(j\omega) \quad \text{(equation 6)}$$
$$[K_2 - \omega^2 M_2] - K_2^2$$

$$X_2(j\omega) = \frac{K_2}{[-\omega^2 M_1 + (K_1+j\omega B_1) + K_2]} F(j\omega)$$
$$[K_2 - \omega^2 M_2] - K_2^2$$

$$N(j\omega) = \frac{(K_2 - \omega^2 M_2)(K_1+j\omega B_1)}{[-\omega^2 M_1 + (K_1+j\omega B_1) + K_2]} F(j\omega)$$
$$[K_2 - \omega^2 M_2] - K_2^2$$

Thus, tuning the resonant frequency of the vibration attenuation unit (TDA) to the driving frequency $\sqrt{K_2/M_2}=\omega$, results in zero dynamic response of the primary system and zero force transmission to the base for any magnitude of the driving force and any damping in the primary system.

This not really evident phenomenon provides anti-resonant response of the primary system with TDA if tuned such that $\sqrt{K_2/M_2}=\omega$. Indeed, also providing undamped TDA having $B_2=0$ provides a simple solution for the motion of the secondary sub-system that is $X_2(\omega)=-F(j\omega)/K_2$. In time domain it is equivalent to notation $x_2=-f/K_2$. Using this notation and assuming $B_2=0$, the term $-K_2 x_2$ in the left hand side of the first of the set of equation 3 cancels the term f in the right hand side of this equation. Therefore, for the equation for the primary sub-system will be $M_1\ddot{x}_1 + K_1 x_1 + K_2 x_1 + B_1 \dot{x}_1 = 0$, containing no excitation factor. Thus, when appropriately tuned, the motion of the proof mass of the TDA, represented here as the secondary sub-system, produces reaction force that is equal in amplitude and opposite in direction with respect to the excitation force independently on the magnitude of the excitation force and damping in the primary sub-system.

Most general model is illustrated in FIG. 3B and providing similar outcome. As exemplified in FIG. 3B, the primary system having arbitrary structure is mounted through arbitrary attachment. Local compliance function of the attachment is given by $H(j\omega)$ describing a response and stimulus at the same point. Using superposition principle, the dynamics of the system can, thus, be described, in the frequency domain, as:

$$X_1(j\omega) = \quad \text{(equation 7)}$$
$$F(j\omega)H_1(j\omega) - [X_1(j\omega) - X_2(j\omega)](K_2+j\omega B_2)H_1(j\omega)$$

$$X_2(j\omega) = X_1(j\omega)\frac{K_2+j\omega B}{K_2 - M_2\omega^2 + j\omega B_2}$$

Similarly to equations 4 and 5, the displacements of the masses and the force transmitted to the base are given by:

$$X_1(j\omega) = F(j\omega)H_1(j\omega)\frac{K_2 - M_2\omega^2 + j\omega B_2}{K_2 - M_2\omega^2 + j\omega B_2 - M_2\omega^2 H_1(j\omega)(K_2+j\omega B_2)} \quad \text{(equation 8)}$$

$$X_2(j\omega) = F(j\omega)H_1(j\omega)\frac{K_2 + j\omega B_2}{K_2 - M_2\omega^2 + j\omega B_2 - M_2\omega^2 H_1(j\omega)(K_2+j\omega B_2)}$$

$$N(j\omega) = F(j\omega)H_1(j\omega)\frac{(K_2 - M_2\omega^2 + j\omega B_2)(K_1+j\omega B_1)}{K_2 - M_2\omega^2 + j\omega B_2 - M_2\omega^2 H_1(j\omega)(K_2+j\omega B_2)}$$

Further, under similar assumption of no damping in the TDA, $B_2=0$, this may be simplified $$X_1(j\omega) = F(j\omega)H_1(j\omega)\frac{K_2 - M_2\omega^2}{K_2 - M_2\omega^2 - M_2\omega^2 H_1(j\omega)K_2} \quad \text{(equation 9)}$$

$$X_2(j\omega) = F(j\omega)H_1(j\omega)\frac{K_2}{K_2 - M_2\omega^2 - M_2\omega^2 H_1(j\omega)K_2}$$

$$N(j\omega) = F(j\omega)H_1(j\omega)\frac{(K_2 - M_2\omega^2)(K_1+j\omega B_1)}{K_2 - M_2\omega^2 - M_2\omega^2 H_1(j\omega)K_2}$$

Similarly to equation 6 in the model of FIG. 3A, providing the TDA is tuned $\omega=\sqrt{K_2/M_2}$, the motion of the secondary mass provides balancing effect and generally results as $X_2(j\omega)=-F(j\omega)/K_2$. Further, as described above, this configuration minimizes motion of the primary mass and thus eliminates, or at least significantly reduces vibration of the system. Thus, a properly tuned TDA can be used to substantially eliminate vibrations along a selected axis.

Figure 4A:
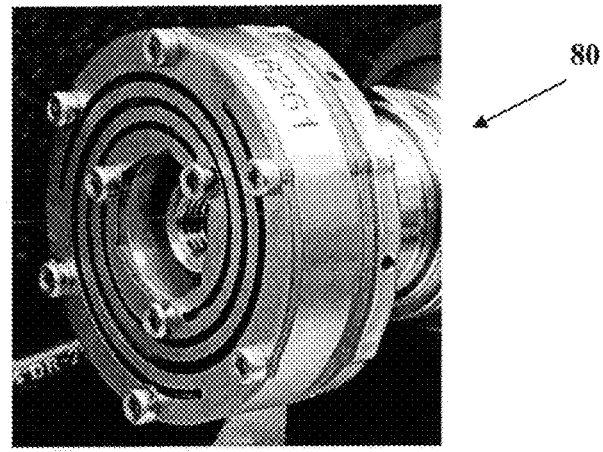
FIGS. 4A and 4B show general configuration of a prior art axial tuned dynamic absorber and simulated data of modal response thereof.
Figure 4B:
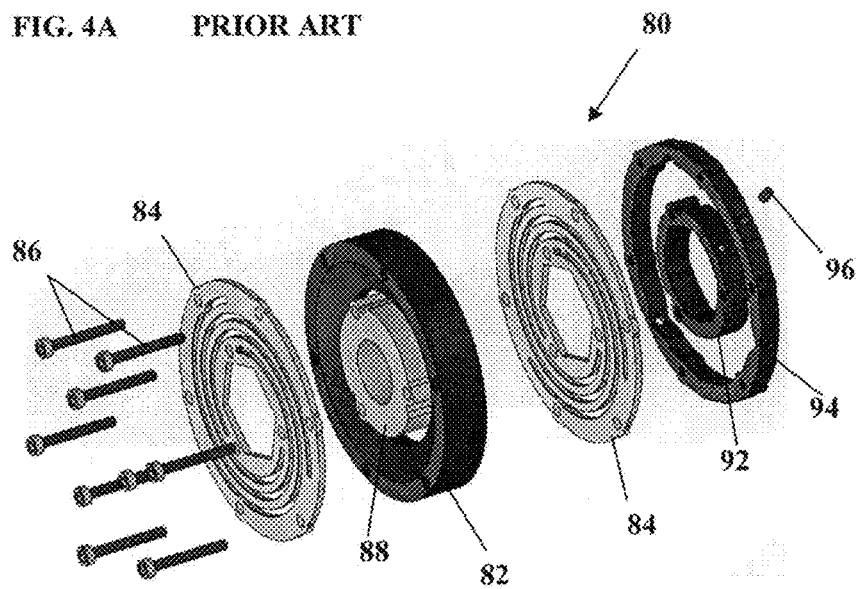

Such conventional TDA is exemplified in FIGS. 4A and 4B illustrating an exemplary configuration of a tunable dynamic absorber as known in the art, configured for attenuating vibration along an axial mode. FIG. 4A illustrates a TDA 80 configuration; FIG. 4B illustrates an exploded structure of the TDA 80. As shown, the TDA 80 generally includes a proof mass element 82 (exemplified as a ring mass) typically made of high density material (Tungsten, Tungsten-Copper or like), the proof mass 82 is supported from both sides by circular planar flexural bearings 84 that may be made of spring steel with spiral slots providing for required axial compliance and high radial compliance. The proof mass 82 and bearings 84 are fastened together by screws 86 protruding through the concentric peripheral and central holes made in the said flexural bearings 84, proof ring 82 and a central spacer 88 and further connected to threaded outer and inner rear rings 92 and 94. Generally, the inner rear ring 92 is used for attaching the mechanical system (e.g. compressor housing) using radial set screw 96.

As indicated above, the conventional configuration TDA is typically configured to provide vibration attenuation along a selected degree of freedom. To this end, resonant frequency along the selected degree of freedom is aligned with typical vibration frequency, while resonant frequencies associated with other degrees of freedom are configured to be distant from the operation frequency to avoid interference and coupling between the degrees of freedom. Typical configuration of such TDA 80, e.g. configured with desired frequency of vibrations to be attenuated is 72 Hz associated with axial vibrations, is configured with determined frequencies associated with rotation about the axis of 113 Hz; tilt modes frequency of 120 Hz and in-plane modes frequencies of 180 Hz.

Such conventional TDA 80 configuration may be powerful tool in attenuation of axial vibrations generated by a compressor unit of a split Stirling cryogenic refrigerator. However, the conventional techniques require a separate TDA associated with each vibration mode, and tuned for the specific corresponding frequency. This may render the system mechanically cumbersome and limit minimizing ability.

Figures 5A, 5B:
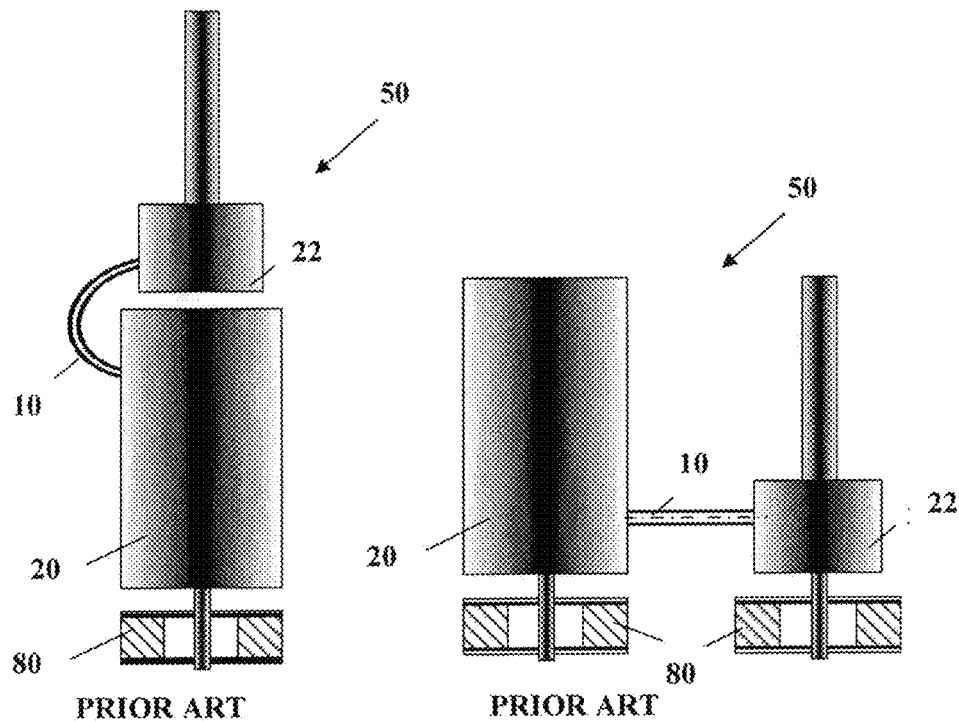
FIGS. 5A and 5B schematically illustrate prior art techniques for reducing vibrations associated with operation of both compressor and expander units of a split Stirling type system.

In system configurations where vibration associated with the expander unit are also to be dealt with, the conventional techniques include two main solutions. These configurations are exemplified in FIGS. 5A and 5B illustrating split Stirling type cryocooler 50 configured with axial arrangement (FIG. 5A) and including two TDA units (FIG. 5B). In the example of FIG. 5A, a single TDA 80 is configured for eliminating vibrations resulting from both the compressor 20 and expander 22. In the example of FIG. 5B the two TDA 80 units are configured such that one TDA 80 attenuates vibrations associated with the compressor 20 and the other TDA attenuates vibrations associated with the expander 22 in the side-by-side arrangement 50. In both examples, the TDA units 80 are configured to attenuate vibrations associated with a single mode, in particular with axial translation mode. Generally, each of the TDA units 80 is configured to attenuate vibrations associated with a single mode and is mounted in accordance with the selected mode.

Contrary to the conventional TDA configurations, the technique of the present invention provides vibration attenuation in two or more degrees of freedom of the system's motion. To this end, the TDA of the present invention is configured with resonant frequencies matched to the typical operation frequency of the corresponding mechanical system, for two or more selected degrees of freedom. Thus eliminating, or at least significantly reducing vibrations associated with the selected two or more degrees of freedom. This configuration of the TDA according to the invention, allows a vibration attenuation unit of a single TDA to eliminate, or at least significantly reduce vibrations associated with two or more degrees of freedom. For example, a side-by-side split Stirling cryogenic refrigerator, where both the compressor and expander unit generate parallel and spaced apart axial forces, may be associated with a vibration attenuation unit as described below. The vibration attenuation unit may thus be configured to eliminate or at least significantly reduce both axial and tilt translation vibrations associated with axial movement of the spaced apart parallel moving elements.

Figure 6:
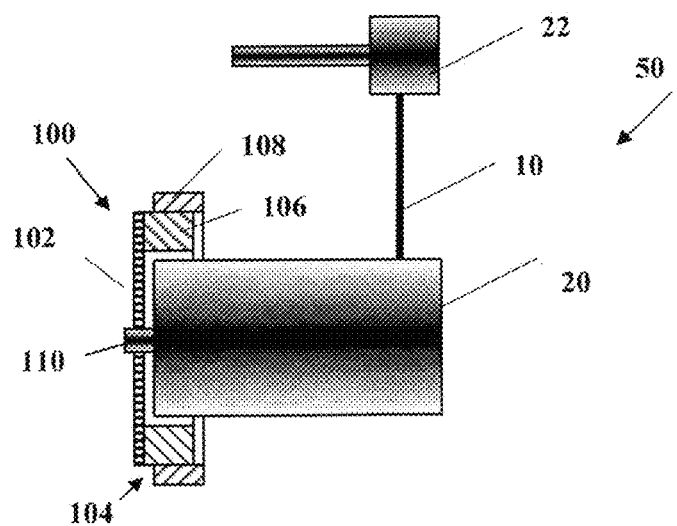
FIG. 6 schematically illustrates a vibration attenuation unit according to the present invention attached to a split Stirling type cryogenic refrigerator.

In this connection, reference is made to FIG. 6 schematically illustrating a side-by-side split Stirling cryogenic refrigerator 50 and associated vibration attenuation unit 100 according to the present invention. The cryogenic refrigerator 50 is generally configured as described above, i.e. having a side-by-side compressor 20 and expander 22 unit connected between them by a transfer line 10. In some configurations, the cryogenic refrigerator 50 may be packaged rigidly, e.g. by mounting the expander 22 and compressor 20 units as close as possible and attaching them together using common frame. Additionally, as indicated above, the compressor 20 and expander 22 units operate in periodic/cycling motion having certain predetermined driving frequency, while having certain delay (or phase difference) between them. Moreover, the magnitude of forces generated by motion of the compressor 20 and expander 22 units may generally be different. Typically the compressor 20 generates higher vibration export with respect to the expander 22 unit. Moreover there exist particular distance between compressor and expander units resulting in generation of vibrational moment and associated tilt response.

The vibration attenuation unit 100 is configured to be attached to a mechanical system, e.g. the cryogenic refrigerator 50, to thereby eliminate or at least significantly reduce vibrations generated thereby. The vibration attenuation unit 100 is configured such that resonant frequencies associated with two or more (and in some configurations three) modes of vibrations, are substantially equal to the driving frequency of the associated mechanical system.

In this connection it should be noted, and will be described in more details further below, that the vibration attenuation unit generally provides certain frequency range of vibration reduction. Generally, at optimal tuning, the vibration amplitude is below 10% of vibration amplitude without attenuation; preferably below 5% and more preferably below 1%.

As exemplified in FIG. 6, the vibration attenuation unit 100 may generally include a proof mass assembly 104 mounted on a flexural bearing 102, where the flexural bearing 102 is rigidly connected to the mechanical system (e.g. cryogenic refrigerator 50) by a rigid connector 110.

Figure 7:
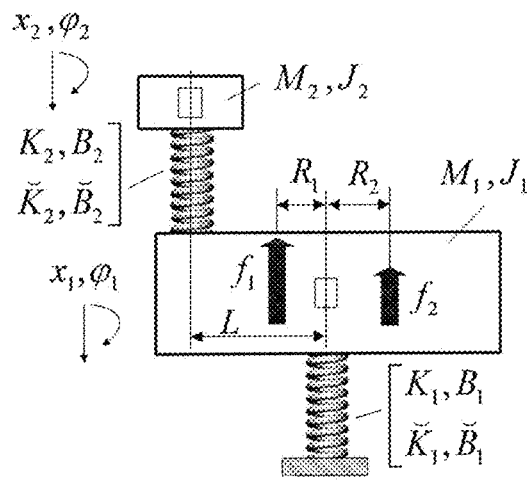
FIG. 7 exemplify rigid body model of reducing vibrations according to the technique of the present invention.

Reference is now made to FIG. 7, illustrating a model exemplifying operational principles of the vibration attenuation unit 100 according to the invention. The mechanical system is represented as a rigid body, having mass $M_1$ and moment of inertia $J_1$. The system is supported on a substrate by attachment that is represented as a spring having linear and angular spring constants and damping of $K_1$, $B_1$, $\check{K}_1$, $\check{B}_1$ respectively. Operation of the mechanical system generates two forces, operating along parallel and spaced apart axes. Two such forces (corresponding e.g. to compressor and expander operation in cryogenic Stirling type refrigerator) $f_1$ and $f_2$ are exemplified in the figure operating at distances $R_1$ and $R_2$ from the center of mass. The forces, $f_1$ and $f_2$ in this example, operate with similar operation frequency $\omega$, while having certain phase and amplitude difference.

The vibration attenuation unit is represented by a proof mass assembly having mass $M_2$ and principal moment of inertia $J_2$, which is mounted/attached to the mechanical system at a distance L with respect to center of mass thereof, by a viscoelastic attachment characterized by linear and angular spring constants and damping of $K_2$, $B_2$, $\check{K}_2$, $\check{B}_2$ respectively. Axial translation and tilt of the mechanical system and proof mass assembly $x_1$, $\varphi_1$ and $x_2$, $\varphi_2$ respectively are defined by:

$$M_1\ddot{x}_1 + K_1 x_1 + K_2(x_1 + L\varphi_1 - x_2) + B_1\dot{x}_1 + B_2(\dot{x}_1 + L\dot{\varphi}_1 - \dot{x}_2) = f_1 + f_2$$

$$M_2\ddot{x}_2 - K_2(x_1 + L\varphi_1 - x_2) - B_2(\dot{x}_1 + L\dot{\varphi}_1 - \dot{x}_2) = 0$$

$$J_1\ddot{\varphi}_1 + K_1\varphi_1 + K_2 L(x_1 + L\varphi_1 - x_2) + \check{K}_2(\varphi_1 - \varphi_2) + \check{B}_1\dot{\varphi}_1 + B_2 L(\dot{x}_1 + L\dot{\varphi}_1 - \dot{x}_2) + \check{B}_2(\dot{\varphi}_1 - \dot{\varphi}_2) = f_1 R_1 + f_2 R_2$$

$$J_1\ddot{\varphi}_1 - \check{K}_2(\varphi_1 - \varphi_2) - \check{B}_2(\dot{\varphi}_1 - \dot{\varphi}_2) = 0 \quad \text{(equation 10)}$$

Similar transition to frequency domain provides:

$$[-\omega^2 M_1 + (K_1 + j\omega B_1) + (K_2 + j\omega B_2)]X_1 + (K_2 + j\omega B_2)(L\Phi_1 - X_2) = F_1 + F_2$$

$$[-\omega^2 M_2 + (K_2 + j\omega B_2)]X_2 - (K_2 + j\Omega B_2)(X_1 + L\Phi_1) = 0$$

$$[-\omega^2 J_1 + (\check{K}_1 + j\omega\check{B}_1) + (\check{K}_2 + j\omega\check{B}_2) + (K_2 + j\omega B_2)L^2]\Phi_1 + (K_2 + j\omega B_2)L(X_1 - X_2) - (\check{K}_2 + j\omega\check{B}_2)\Phi_2 = F_1 R_1 - F_1 R_2$$

$$(-\omega^2 J_2 + \check{K}_2 + j\omega\check{B}_2)\Phi_2 - (\check{K}_2 + j\omega\check{B}_2)\Phi_1 = 0 \quad \text{(equation 11)}$$

From equation 11, the axial and angular responses of the primary mass can be defined as:

$$(X_1 + L\Phi_1) = \frac{[-\omega^2 M_2 + K_2 + j\omega B_2]}{(K_2 + j\omega B_2)} X_2 \quad \text{(equation 12)}$$

and $$\Phi_1 = \frac{(-\omega^2 J_2 + \overline{K}_2 + j\omega\overline{B}_2)}{(\overline{K}_2 + j\omega\overline{B}_2)} \Phi_2$$

Thus, similarly to the conventional technique, setting $K_2 = \omega^2 M_2$ and $\check{K}_2 = \omega^2 J_2$ eliminates the dynamic responses $X_1$ and $\Phi_1$, under the assumption of no damping, i.e. $B_2 = 0$.

Returning back to FIG. 6, the vibration attenuation unit 100 is configured with a proof mass assembly, having at least two proof mass elements. Two such proof mass elements 106 and 108 (proof rings) are exemplified in the figure. Total mass of the proof mass assembly provides $M_2$ and determines, in accordance with axial spring rate $K_2$ of the flexural bearing, the resonant frequency associated with axial translation. Additionally, relative arrangement of the proof masses 106 and 108 of the proof mass assembly determines total moment of inertia $J_2$ of the proof mass assembly. This further determines, in accordance with angular spring rate $\check{K}_2$ of the flexural bearing, the resonant frequency associated with angular motion.

To this end, the vibration attenuation system 100 is configured with a proof mass assembly including two or more proof mass elements. At least one of the proof mass elements is movable along an axial direction with respect to point of attachment and/or center of mass of the associated system, to thereby enable tuning of moment of inertia of the vibration attenuation unit and matching resonant frequency thereof with operation frequency of the associated mechanical system. Generally, the total mass of the proof mass assembly is determined by proper selection of the proof mass elements (e.g. first and second proof mass elements) to provide desired resonant frequency for vibration attenuation. The driving frequency of an associated mechanical system, e.g. split Stirling cryogenic refrigerator, is tuned to minimize axial vibrations. This provides reduced vibration of at least 90%, preferably at least 95% and more preferably at least 99%, in amplitude of vibration. When the axial vibration is sufficiently minimized, position of the second proof mass element may be varied to provide minimization of angular (tilt) vibration by at least 90%, preferably at least 95% and more preferably at least 99%, in amplitude of vibration.

Generally, in the current example, the vibration attenuation unit 100 includes a planar flexural bearing 102 having circular shape. The bearing is connected at its center to a mounting element 110 for connection to a mechanical system, and is connected to the proof mass assembly 104 at periphery thereof. The proof mass assembly 104 may be circularly symmetric and include first 106 and second 108 proof mass elements in the form of rings. The second proof mass element 108 is generally configured to be selectively moved with respect to an axis perpendicular to the plane of the bearing 102. The second proof mass element (ring) 108 may be configured with inner diameter tightly matching an outer diameter of the first proof mass element 106 to eliminate vibrations associated with the proof mass assembly. This is while the internal diameter of the first proof ring 106 is slightly higher than outer diameter of the mounting element 110 to allow relative displacement.

Thus, the this exemplary embodiment, the vibration attenuation unit 100 is configured such that total mass of the proof mass assembly together with spring constant of the flexural bearing 102 provides axial resonant frequency essentially equal to operation frequency of a cryogenic refrigerator attached thereto. Further, relative displacement of the second proof mass element 108 allows tuning of moment of inertia of the proof mass assembly 104, which together with angular spring constant of the bearing 102 determine an resonant frequency associated with tilt modes (generally two tilt modes for circular unit 100) to be essentially equal, the driving frequency of the cryogenic refrigerator 50. Further driving frequency of the cryogenic refrigerator may also be slightly tuned to match the anti-resonant frequency without replacing proof mass elements.

Figure 8A:
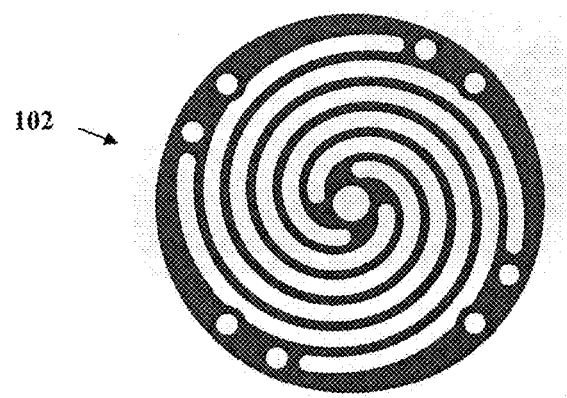
FIGS. 8A and 8B illustrate configuration of a flexural bearing (FIG. 8A) and of a vibration attenuation unit (FIG. 8B) according to some embodiments of the present invention.
Figure 8B:
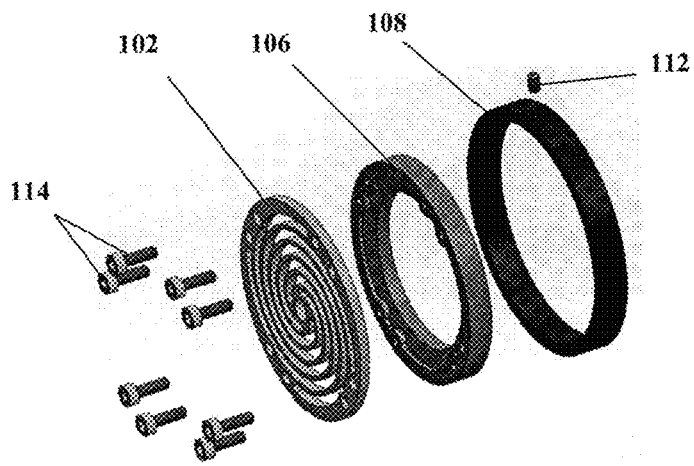

An exemplary configuration of the vibration attenuation unit 100 is illustrated in FIGS. 8A and 8B. FIG. 8A illustrates a circular planar flexural bearing element 102, and FIG. 8B illustrates the bearing 102 and proof mass elements 106 and 108 in exploded model form. The flexural bearing 102 may generally be a metal plate featuring symmetrical spiral slots. The etching and material selection (e.g. suitable steel or other alloys, Titanium etc.) provides the hearing low damping and high quality spring features. The spiral etchings affect the metal plate to act as springs connecting the central region of the bearing 102 with the periphery thereof, thus allowing several degrees of freedom. Such degrees of freedom generally include axial translation (perpendicular to plane of the bearing) and two tilt axial modes, as well as rotation and in plane motion.

As indicated, the proof mass assembly 104 is mounted on periphery of the metal plate 102 of the bearing, typically using a set of screws 114. The proof mass assembly 104 is configured such that total mass thereof, i.e. mass of all the proof mass elements and, if used, screws and attachment elements, is determined to provide the desired axial resonant frequency. Further, the proof mass assembly 104 is preferably configured to have circular symmetry around the center of the flexural bearing 102 to avoid coupling between degrees of freedom of vibrations.

The moment of inertia $J_2$ of the proof mass assembly 104 may be adjusted by determining location of the displaceable proof mass element 108. By shifting location of the second proof mass 108, the moment of inertia of the proof mass assembly 104 may be increased or decreased. To this end, the second proof mass element 108 is typically configured to be selectively moveable along an axis perpendicular to the plane of the bearing 102 and fixed at a selected location, e.g. by a set screw 112. Location of the second proof mass element 108 determines resonant frequency associated with two tilt degrees of freedom about the axial direction (axis perpendicular to plane of the flexural bearing 102) in accordance of angular spring constant of the bearing 102.

This configuration enables tuning of resonant frequencies of the vibration attenuation unit 100 with respect to two or more uncoupled degrees of freedom separately, such that tuning of frequency of tilt modes practically does not affect the frequency associated with axial translation mode. Additionally, frequencies associated with other, undesired, modes may be kept distant from the desired operation frequency (e.g. that of the corresponding mechanical system—cryogenic refrigerator in some examples).

Figure 9A:
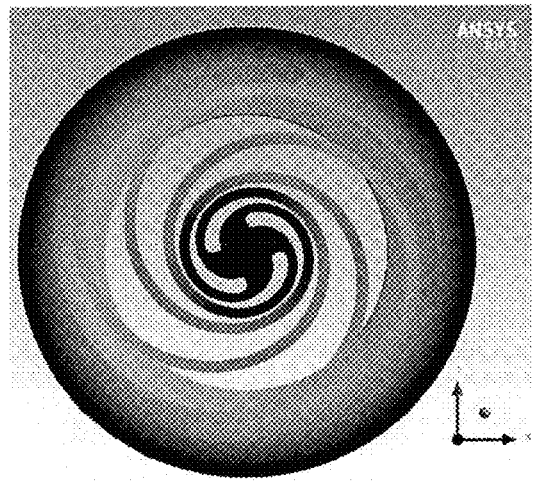
FIGS. 9A to 9F show results of simulated analysis of axial translation (FIGS. 9A and 9B), tilting (FIGS. 9C and 9D) and in plane translation (FIGS. 9E and 9F) modes of a vibration attenuation unit according to some embodiments of the invention.
Figure 9B:
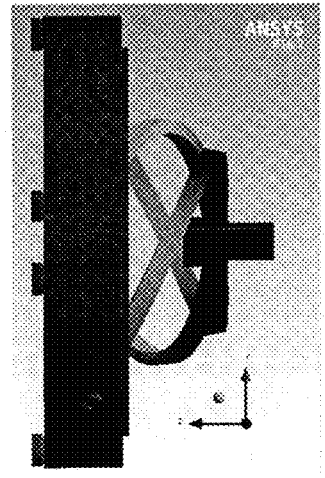
Figure 9C:
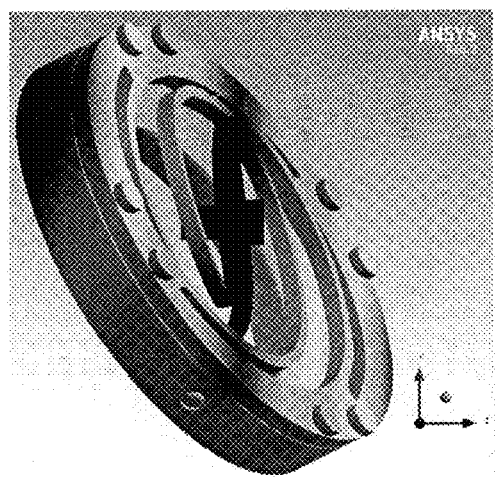
Figure 9D:
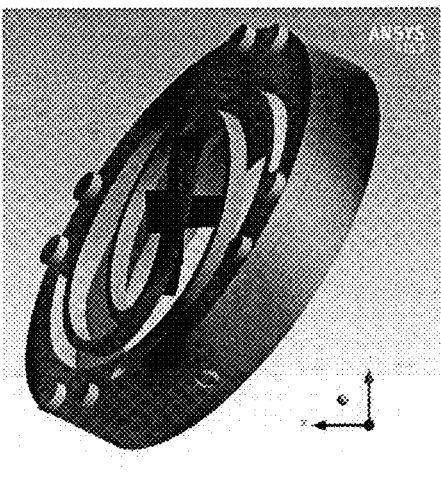
Figure 9E:
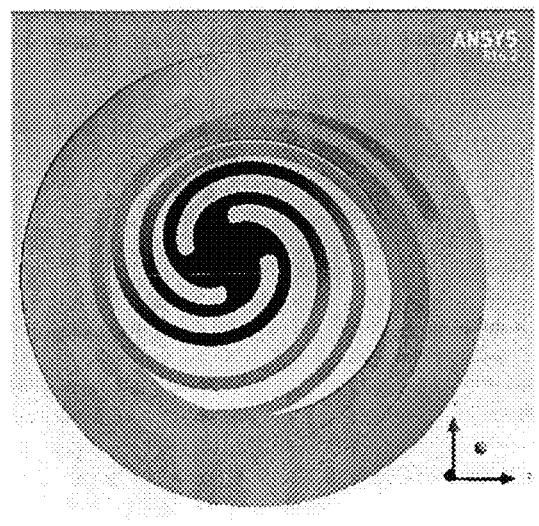
Figure 9F:
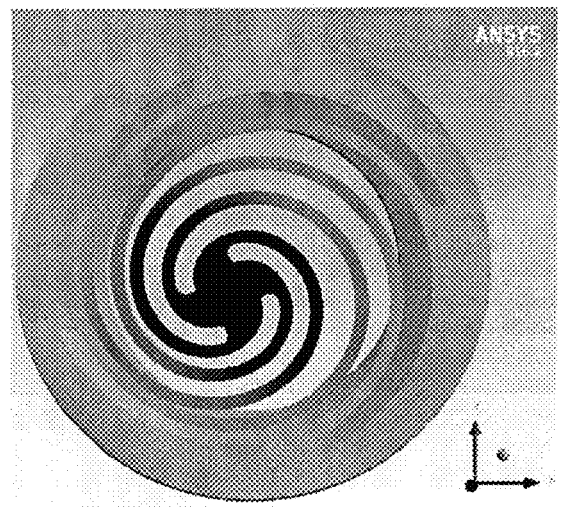

In this connection, reference is made to FIGS. 9A to 9F illustrating finite elements modeling of different modes of the vibration attenuation unit according to some embodiments of the invention. FIG. 9A shows simulated rotation about the unit's axis; FIG. 9B simulates axial translation; FIGS. 9C and 9D show simulated two orthogonal (e.g. horizontal and vertical) tilt modes; and FIGS. 9E and 9F simulate in plane translation. According to the simulated models in this example, the resonant frequencies associated with tilting and translation modes are equalized at 75 Hz. More specifically, the axial resonant frequency is determined by total mass of the proof mass assembly and tilt resonant frequencies are determined by virtual displacing the second proof mass element ring into suitable position. The suitable position of the second proof mass element is herein referred to as zero position for simplicity. It should be noted that the frequency of 75 Hz is selected as an example frequency suitable for operation of different types of mechanical systems including various configurations of Stirling-type cryogenic refrigerators. It should be clear that by proper selection of material, design and thickness of the flexural bearing 102 and corresponding masses of the proof mass assembly 104, the resulting operation frequency may be generally any frequency within meaningful range for mechanical operation.

Figure 10:
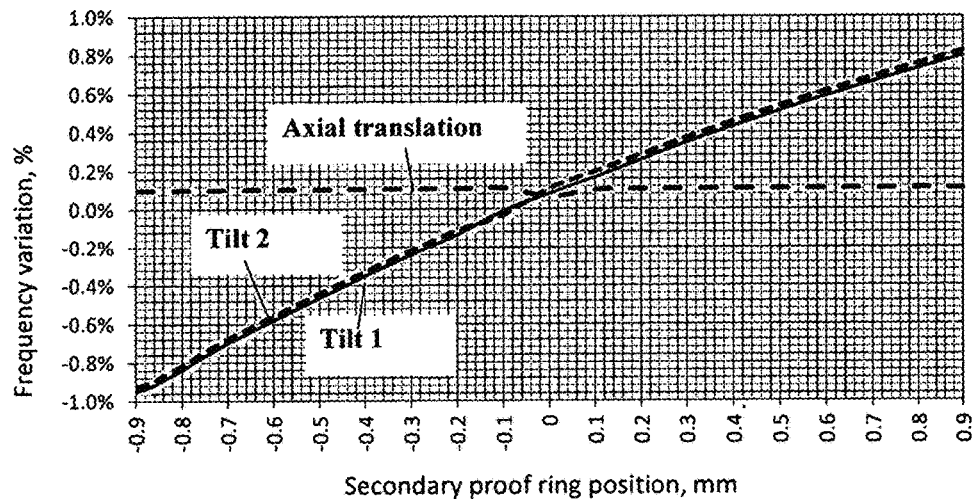
FIG. 10 shows sensitivity analysis for dependence of translation and tilt frequencies on the position of the secondary proof ring according to the present invention.

In this connection, FIG. 10 exemplifies typical variations of the translational and tilting frequencies based on the position of the secondary proof mass element 108 (shown in FIG. 8B). As shown, the resonant axial and tilt frequencies are determined for second proof mass element 108 locations within the range ±1 mm counted from the optimum desired position. The axial frequency remains practically constant, while two tilt frequencies are simultaneously varying by ±1% due to change in moment of inertia of the proof mass assembly. This allows fine tuning frequencies associated with tilt vibrations while maintaining the axial frequency unchanged.

Figure 11A:
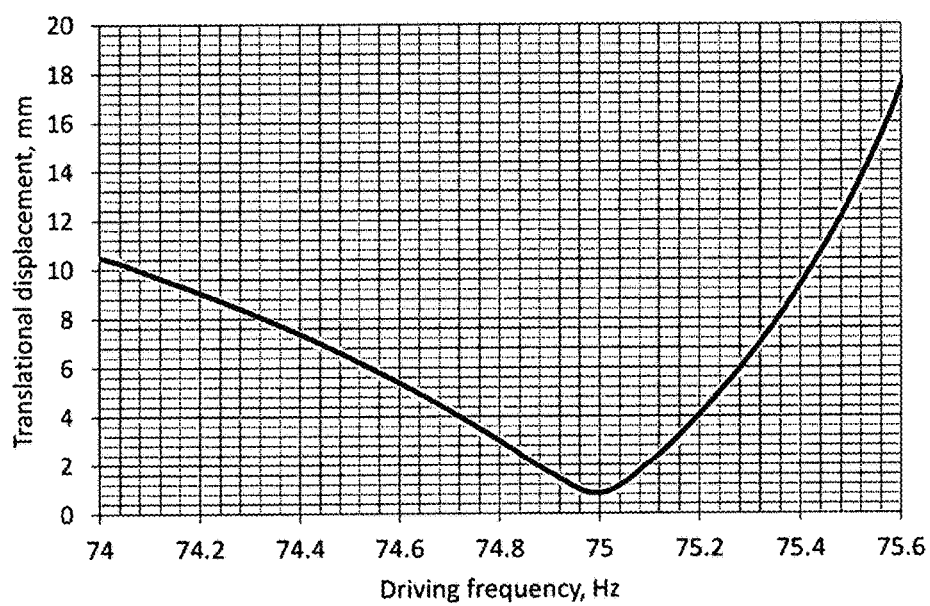
FIGS. 11A and 11B show graphs of vibration amplitude for axial vibration with respect to driving frequency (FIG. 11A) and for axial and angular vibration with respect to position of the second proof mass element (FIG. 11B)
Figure 11B:
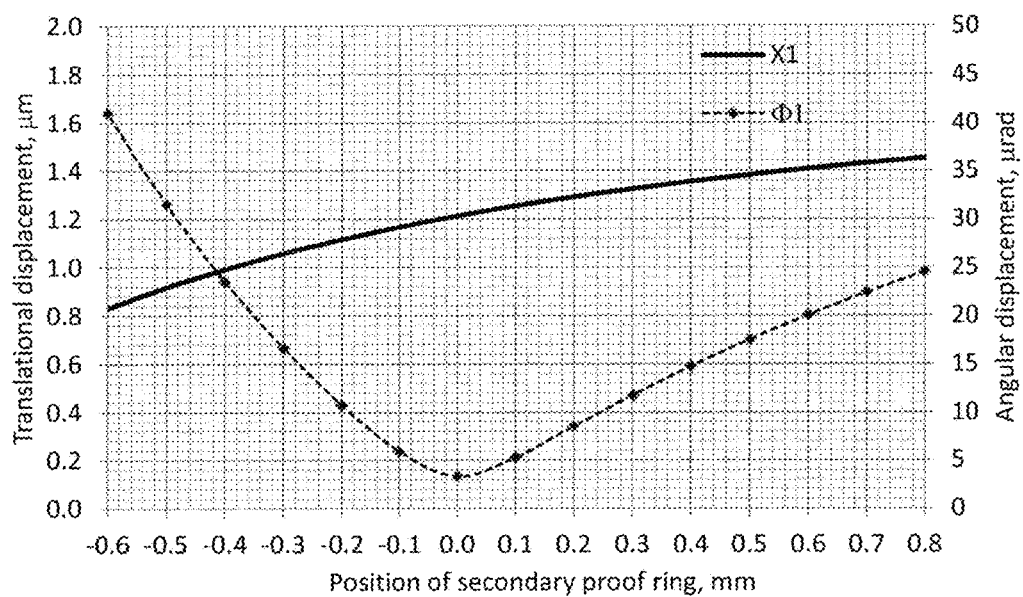

Additionally, FIGS. 11A and 11B show two graphs of vibration amplitude as a response to tuning of the vibration attenuation unit of the invention. FIG. 11A shows axial vibration amplitude, in μm, as a function of driving frequency and FIG. 11B shows angular vibration amplitude, in μrad, as function of position of second proof mass element and its effect on axial vibration amplitude.

Generally, in this example, the proof mass assembly is configured, together with spring constants of the resonant frequency of the flexural bearing plate, to provide resonant frequency of 75 Hz. The driving frequency of the associated Split Stirling cryogenic refrigerator is tuned to be similar of the resonant frequency and thus minimize axial vibrations. As shown in FIG. 11A, the driving frequency is varied between 74 Hz and 75.6 Hz, and the vibration amplitude is reduced from between 10 μm and 188 μm to a minimum of 0.83 μm, providing reduction of more than 90% relative to the use of a TDA without proper tuning. Typically the vibration attenuation may provide reduction of vibration amplitude of 99% or more with respect to the same system without vibration attenuation unit.

When the driving frequency is set, the position (axial position) of the second proof mass element may be determined. FIG. 11B shows tilt vibration amplitude in micro radians (Φ1) as a response to variations in position of the second proof mass element. The figure also shows corresponding effect on axial vibration amplitude in micrometer. For simplicity, the zero location is determined at the minimal tilt vibration amplitude. The split Stirling refrigerator is operated at fixed driving frequency providing minimal axial vibration, and the angular vibration is measured using angular accelerometer. As shown minimal angular vibration of about 4 μRad is achieved at the suitable position, with respect to angular vibration amplitude of 25 μRad at 0.8 mm displacement and 40 μRad at −0.6 mm displacement. This provides vibration reduction of at least 85% with respect to improper positioning of the proof mass element. Generally, the vibration reduction may be of 90% or more, and more preferably of 95% or more.

Additionally, FIG. 11B shows the effect of different positions of the second proof mass on axial vibration amplitude (X1). As shown, the amplitude of axial vibration varied between 0.83 μm for location of −0.6 mm to amplitude of about 1.4 μm at position of 0.8 mm of the second proof mass element. Further, at the optimal location of the proof mass element, the axial vibration amplitude was 1.2 μm. Taking in account the vibration amplitude without tuning of the vibration attenuation unit, or without the use of the vibration attenuation unit, the axial vibration is practically independent of the axial position of the second proof mass element.

Figure 12:
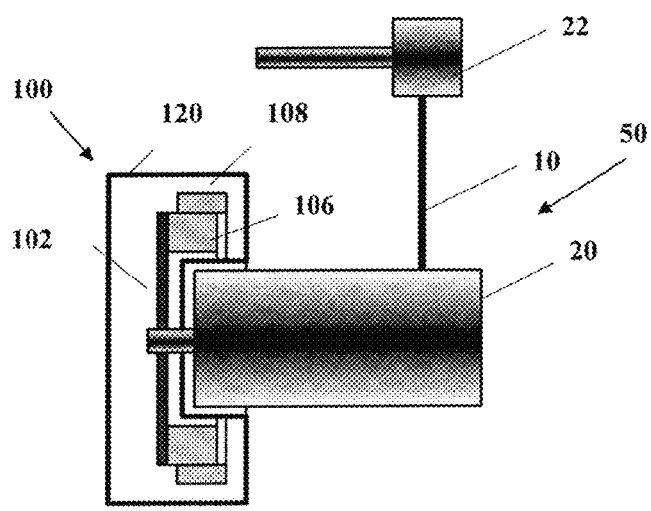
FIG. 12 schematically illustrates a vibration attenuation unit attached to a cryogenic refrigerator according to some additional embodiments of the present invention, utilizing vacuum chamber for reducing the aerodynamic friction

Reference is made to FIG. 12 illustrating a cryogenic refrigerator system 50 mounted with connection to a vibration attenuation 100 according to some embodiments of the invention. In this example, the vibration attenuation unit 100 is attached to the cryogenic refrigerator 50 and is located in an enclosed space 120 having sub-atmospheric pressure. As indicated above, performance of the vibration attenuation unit 100 (or generally of a TDA) is strongly dependent on the amount of damping. More specifically, zero damping provides optimal performance, and as the damping increases the attenuation ratio decreases. To this end the vibration attenuation unit 100 may be places in a closed evacuated envelope. This reduces interaction of the proof mass assembly and the flexural bearing with air and thus reduces friction. This is in addition to the use of single flexural bearing featuring frictionless fastening allows essential reduction of friction. The pressure in the closed space 120 may be medium to high vacuum conditions, e.g. in the range of $10^{-2}$ to $10^{-4}$ Torr. Additionally, at high frequencies, axial vibrations of the vibration attenuation unit 100 may act as a piston, or piston like element, producing essential level of audible noise. Operating within vacuum and inside envelope reduces the noise radiation as well as friction, and generally any type of work caused by movement of the unit. Additionally, the enclosed space provides protection to the vibration attenuation unit 100 from contact with foreign parts, such as other moving elements, environment etc.

Thus, as described above, the present invention provides a technique and system for attenuating vibrations associated with operation of mechanical system. The system of the invention provide attenuation of vibration associated with two or more, vibrational modes and thus reducing complexity in reducing vibration, as well as in design of multi-element mechanical systems. The technique of the invention is of particular use in connection with side-by-side mounted Stirling type cryogenic refrigerator, allowing quiet and compact design of vibration free cryogenic cooling systems. Those skilled in the art will readily appreciate that various modifications and changes can be applied to the embodiments of the invention as hereinbefore described without departing from its scope defined in and by the appended claims.

The invention claimed is:

1. A cryogenic refrigerator comprising: linear Split Stirling unit having an expander unit and a compressor unit mounted in a side by side configuration upon a common frame, and a vibration attenuation unit attached to said Split Stirling unit and comprising an undamped mass-spring system comprising a planar flexural bearing and a proof mass assembly; said vibration attenuation unit being configured for attenuating vibrations of said linear Split Stirling unit at operation frequency of said linear Split Stirling unit along two or more modes of vibrations; and wherein said proof mass assembly comprises at least one primary proof mass element mounted fixedly on a peripheral anchor of said flexural bearing, and at least one secondary proof mass element mounted on and moveable with respect to said primary proof mass element.

2. The cryogenic refrigerator of claim 1, wherein said operation frequency of the Split Stirling unit is a fixed frequency.

3. The cryogenic refrigerator of claim 1, wherein said vibration attenuation unit is configured for vibration attenuation along at least one axial mode and at least two tilt modes with respect to a predetermined reference axis of the system.

4. The cryogenic refrigerator of claim 1, where said planar flexural bearing is configured as a planar circular disc comprising a plurality of symmetrical spiral slots, said planar flexural bearing is connectable to said proof mass assembly at a peripheral anchor and to said Split Stirling unit at a central anchor thereof.

5. The cryogenic refrigerator of claim 4, wherein the flexural bearing is made of metal or metal alloy.

6. The cryogenic refrigerator of claim 1, wherein said total mass and arrangement of proof mass elements of the proof mass assembly are configured with respect to corresponding spring constants of said flexural bearing to provide desired resonant frequencies associated with said of two or more modes of vibration, said desired resonant frequencies are both being substantially similar to an operational frequency of said linear Split Stirling unit.

7. The cryogenic refrigerator of claim 1, wherein said primary and secondary proof mass elements are configured as concentric rings.

8. The cryogenic refrigerator of claim 1, wherein said vibration attenuation unit is circularly symmetric.

9. The cryogenic refrigerator of claim 1, wherein said vibration attenuation unit is mounted in-line with axis of translation of a piston of said compressor unit.

10. The cryogenic refrigeration of claim 1, wherein said vibration attenuation unit being located within an evacuated chamber having sub-atmospheric pressure for reducing the aerodynamic damping, aural noise generation and transmission.

* * * * *